United States Patent
Newberry

(10) Patent No.: US 10,318,394 B2
(45) Date of Patent: Jun. 11, 2019

(54) USB TYPE-C TO LEGACY USB CABLE DETECTION

(71) Applicant: FAIRCHILD SEMICONDUCTOR CORPORATION, Sunnyvale, CA (US)

(72) Inventor: William Robert Newberry, Cumberland Foreside, ME (US)

(73) Assignee: Fairchild Semiconductor Corporation, Phoenix, AZ (US)

( * ) Notice: Subject to any disclaimer, the term of this patent is extended or adjusted under 35 U.S.C. 154(b) by 90 days.

(21) Appl. No.: 15/678,323

(22) Filed: Aug. 16, 2017

(65) Prior Publication Data

US 2018/0060201 A1 Mar. 1, 2018

Related U.S. Application Data

(60) Provisional application No. 62/380,139, filed on Aug. 26, 2016.

(51) Int. Cl.
| | |
|---|---|
| *G06F 1/26* | (2006.01) |
| *G06F 11/22* | (2006.01) |
| *G06F 1/3206* | (2019.01) |
| *G06F 1/3234* | (2019.01) |
| *G06F 11/30* | (2006.01) |
| *G06F 13/38* | (2006.01) |

(Continued)

(52) U.S. Cl.
CPC ............ *G06F 11/221* (2013.01); *G06F 1/266* (2013.01); *G06F 1/28* (2013.01); *G06F 1/30* (2013.01); *G06F 1/3206* (2013.01); *G06F 1/3253* (2013.01); *G06F 11/2294* (2013.01); *G06F 11/3051* (2013.01); *G06F 13/385* (2013.01); *G06F 13/4282* (2013.01); *Y02D 10/14* (2018.01); *Y02D 10/151* (2018.01)

(58) Field of Classification Search
None
See application file for complete search history.

(56) References Cited

U.S. PATENT DOCUMENTS 6,125,455 A * 9/2000 Yeo .......................... G06F 1/266
713/300
8,035,368 B2 * 10/2011 May ........................ G06F 1/266
323/318

(Continued)

OTHER PUBLICATIONS

STMicroelectronics, Microcontroller Division, "AN 1040 Application Note, Monitoring the Vbux Signal for USB Self-Powered Devices," [Jan. 1, 1999].

(Continued)

*Primary Examiner* — Cheng Yuan Tseng
(74) *Attorney, Agent, or Firm* — Brake Hughes Bellermann LLP

(57) ABSTRACT

A port controller includes an advertise block configured to determine a cable assembly coupled to the port controller is not compliant with a standard used by the port controller, a comparator configured to determine a current drawn from a power converter coupled to the cable assembly exceeds a capability of the power converter based on comparing a bus voltage to a threshold voltage, and a protection block configured to, in response to determining the current drawn from the power converter exceeds the capability of the power converter, cause the current drawn from the power converter to be reduced.

20 Claims, 5 Drawing Sheets

(51) Int. Cl.
    *G06F 13/42*     (2006.01)
    *G06F 1/28*     (2006.01)
    *G06F 1/30*     (2006.01)

(56) References Cited

U.S. PATENT DOCUMENTS

| | | | |
|---|---|---|---|
| 9,588,563 B2* | 3/2017 | Rathi | G06F 1/266 |
| 9,748,761 B2* | 8/2017 | Ohwaki | H02H 3/0935 |
| 10,082,853 B2* | 9/2018 | Sun | G06F 1/266 |
| 2014/0173141 A1 | 6/2014 | Waters | |

OTHER PUBLICATIONS

Bob Dunstan et al., "Universal Serial Bus Power Delivery Specification," Rev. 3.0, Ver. 1.1, Jan. 12, 2017, 579 pages.

* cited by examiner

USB TYPE-C TO LEGACY USB CABLE DETECTION

RELATED APPLICATION

This application claims priority to and the benefit of U.S. Provisional Application No. 62/380,139, entitled, "NON-COMPLIANT USB TYPE-C TO LEGACY USB CABLE DETECTION," filed Aug. 26, 2016, which is incorporated herein by reference in its entirety.

FIELD

Embodiments relate to current being drawn from a universal serial bus (USB) power converter.

BACKGROUND

Charging devices can include a variety of components that are based on different Universal Serial Bus (USB) standards. For example, a computing device can be configured to use a one standard (e.g., USB TYPE-C) and the power converter used to power the computing device can be based on an older standard (e.g., USB TYPE-A). Components that are configured based on the newer standard (e.g., protective features, communication capabilities, and the like) may not function as designed in conjunction with components based on the older standard.

SUMMARY

In at least one general aspect, a port controller includes an advertise block configured to determine a cable assembly coupled to the port controller is not compliant with a standard used by the port controller, a comparator configured to determine a current drawn from a power converter coupled to the cable assembly exceeds a capability of the power converter based on comparing a bus voltage to a threshold voltage, and a protection block configured to, in response to determining the current drawn from the power converter exceeds the capability of the power converter, cause the current drawn from the power converter to be reduced.

In another general aspect, a method includes coupling a power converter to a device via a cable assembly configured to indicate incorrect information related to a capability of the power converter, drawing current from a power converter to at least one of charge a battery associated with a device or power the device, determining if a bus voltage on the device is less than a threshold voltage, and in response to determining the bus voltage is less than the threshold voltage, causing the current drawn from the power converter to be reduced.

In yet another general aspect, a device includes a battery, a battery charger configured to draw current from a power converter to at least one of charge the battery and power the device, and a port controller. The port controller is configured to determine a cable assembly coupled to the port controller is not compliant with a standard used by the device, determine a current drawn from the power converter coupled to the cable assembly exceeds a capability of the power converter based on comparing a bus voltage to a threshold voltage, and in response to determining the current drawn from the power converter exceeds the capability of the power converter, cause the current drawn from the power converter to be reduced.

Figure 1:
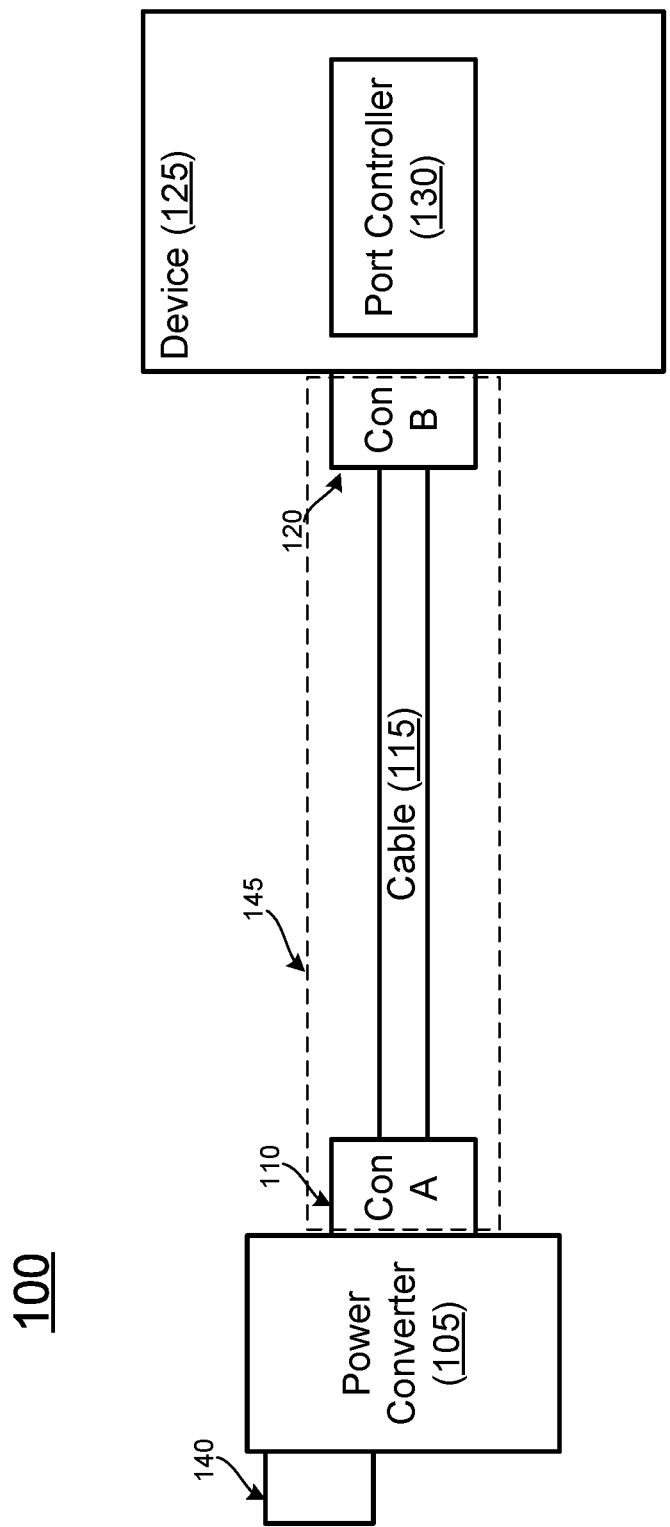
FIGS. 1 and 2 are block diagrams illustrating systems according to example embodiments.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative positioning of regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

A device can be configured to receive power from a power converter via a cable. The cable can have a connector on each end—one that can be plugged into the power converter and one that can be plugged into the computing device. The cable with connectors on each end can collectively be referred to as a cable assembly. Each of these components, the computing device, the cable assembly, and the power converter, can be based on different Universal Serial Bus (USB) standards. These components can be mechanically compatible such that, for example, the power converter can be coupled to the connector on one end of the cable assembly and the computing device can be coupled to the connector on the other end of the cable assembly. However, one or more of these components may not be electrically compliant with the same USB standards (e.g., more recent USB standards (e.g., USB TYPE-C may not be electrically compliant with older USB standards (e.g., USB TYPE-A)). Accordingly, a user of various USB components (e.g., computing device, cable assembly, power converter, etc.) may use (e.g., couple) a combination of the various USB components that are mechanically compatible, but not electrically compatible.

For example, a cable assembly and a power converter can be electrically configured based on an older USB standard (e.g., USB TYPE-A) and the computing device can be configured electrically based on a newer USB standard (e.g., USB TYPE-C). Even though electrically incompatible, the power converter based on the older USB standard may be mechanically coupled without an issue to the computing device based on the newer USB standard. The computing device can be configured, for example, to draw a current based on the newer USB standard at a rate greater than a rate that the power converter is capable of providing based on the older USB standard. This can result in damage to the computing device, cable, connectors and/or the power converter.

As a specific example, a cable assembly that is not compliant with the electrical portion of the USB TYPE-C standard may attempt to indicate (e.g., advertise, communicate) a current capability of a power converter when powering a USB TYPE-C capable computing device. The USB TYPE-C capable computing device using the cable assembly that is not compliant with the electrical portion of USB TYPE-C standard may thereby have incorrect information related to the capability of the power converter. As a result, the USB TYPE-C capable computing device may attempt to draw current based on an advertised capability that is not based on the capabilities of the coupled power converter. This current may exceed the actual capability of the coupled power converter, resulting in unsafe conditions and/or damage to the computing device, the cable and/or the power supply.

In example embodiments described herein, a USB TYPE-C capable computing device can be configured to detect when a cable assembly that is not compliant with the electrical portion of USB TYPE-C standard is used and/or detect when a current draw is above the capability of a coupled power converter. Further, in some example implementations described herein, the USB TYPE-C capable computing device can be configured to reduce the current draw when the current draw is above the capability of a coupled power converter. Thus, preventing unsafe conditions and/or damage to the computing device, cable, connectors and/or the power converter even when a user mechanically couples components based on different USB standards.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 2:
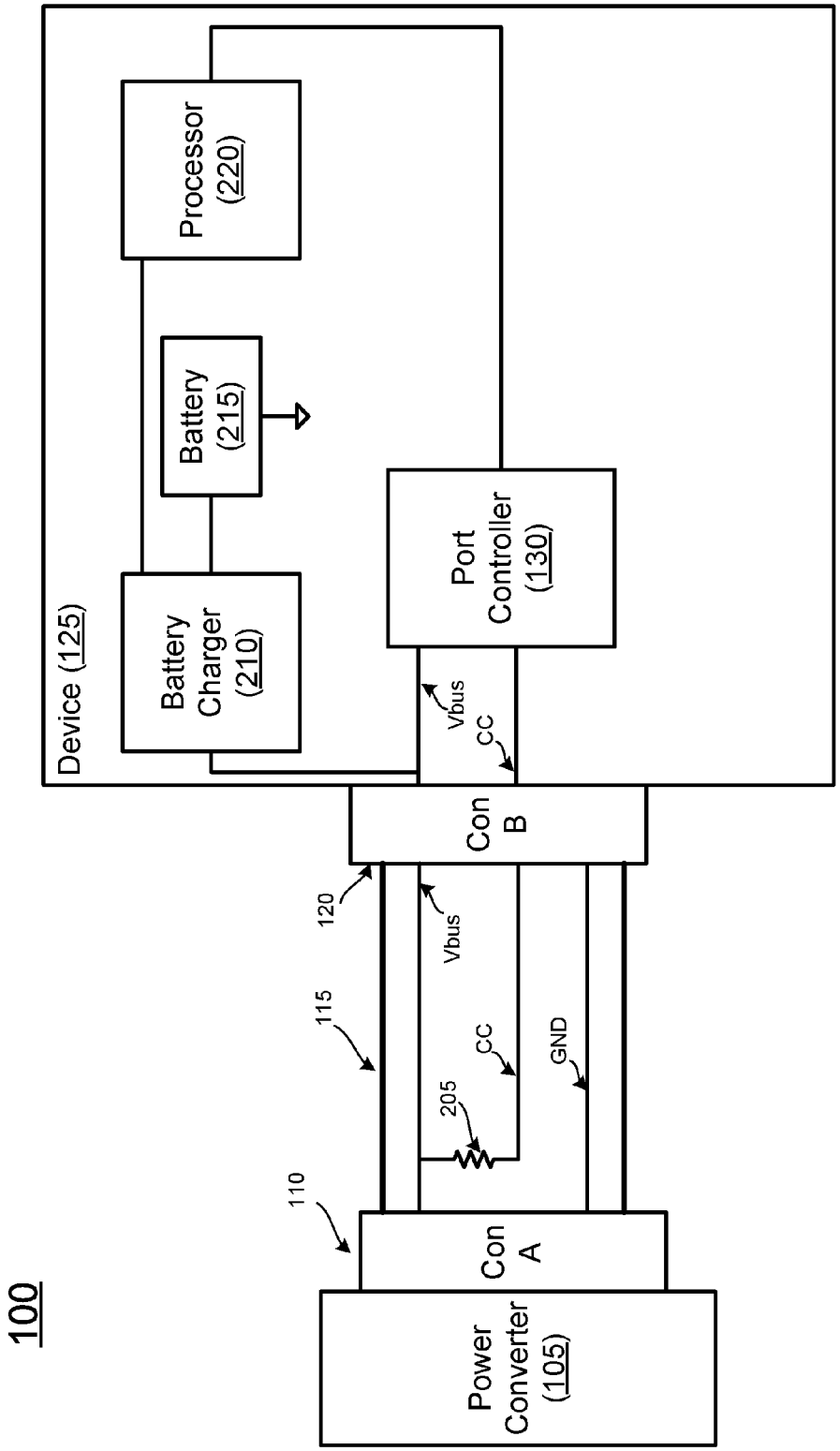

FIGS. 1 and 2 are block diagrams illustrating systems according to at least some example embodiments. As shown in FIG. 1, the system 100 can include a power converter 105 and a computing device 125. The power converter 105 can be a travel adapter, a wall charger, a power brick, and the like. Therefore, the power converter 105 includes wall plug 140 used to couple the power converter 105 to a power source (e.g., a wall outlet) The power converter 105 can also be an element of a computing device including a battery as a source of power.

The power converter 105 can be configured to provide power (e.g., voltage and current) to the computing device 125 via cable 115. The computing device 125 can be any computing device (e.g., mobile phone, laptop, smart watch, and the like). The computing device 125 can be configured for fast (e.g., quick, rapid, and the like) charging based on a new USB standard. For example, the computing device 125, if configured with fast charging capability, can be configured to draw a larger amount of power (e.g., more current and/or a higher voltage) from the power converter as compared to older USB standards. The computing device 125 can be configured to draw a fixed and/or variable current and/or voltage.

Connector A 110 can be a first type of connector (e.g., USB TYPE-A) and connector B 120 can be a second type of connector (e.g., USB TYPE-C). The power converter 105 has a corresponding connector that is compatible with and can be coupled with connector A 110. The computing device 125 has a corresponding connector that is compatible with and can be coupled with connector B 120. The cable 115, connector A 110 and connector B 120 together can be a cable assembly 145. Connector B 120 can be, or can include, two (or more) elements. For example, connector B 120 can be a USB TYPE-A connector coupled to the cable 115 and a USB TYPE-C adapter coupled between the USB TYPE-A connector and the computing device 125.

The computing device 125 includes a port controller 130. The port controller 130 can be configured to determine whether a connector (e.g., connector B 120) coupled to the port controller 130 is not compliant with a standard (e.g., USB TYPE-C) used by the port controller 130 and/or determine whether a current drawn from a power converter (e.g., power converter 105) coupled to the connector exceeds a capability of the power converter. In response to determining the current drawn from the power converter 105 exceeds the capability of the power converter 105, the port controller 130 can be configured to cause the current drawn from the power converter 105 to be reduced (e.g., reduce current drawn by computing device 125).

FIG. 2 is a more detailed view of the components of FIG. 1. As shown in FIG. 2, the system 100 can further include a pull-up resistor 205 coupled between a Configuration Channel (CC) node (e.g., coupled to a channel used for communicating configuration and status information between the power converter 105 and the computing device 125) and a Bus Power ($V_{bus}$) node (e.g., coupled to a bus used for transferring power from the power converter 105 to the computing device 125). The example shown in FIG. 2 illustrates the pull-up resistor 205 as being included (e.g., located) in the cable 115. In some implementations, the pull-up resistor 205 can be included in the connector B 120 or an adapter connected to connector B 120. The pull-up resistor 205 (e.g., a resistance value thereof) can be based on a capability (e.g., current capacity) of the power converter 105. For example, a processor can determine a voltage drop across the pull-up resistor 205 can determine a maximum current draw capability of the power converter 105 based on the pull-up resistor 205.

As shown in FIG. 2, the port controller 130 included in the computing device 125 is configured to prevent a current draw that exceeds a current draw capability of the power converter 105 when a cable assembly that is not compliant with the electrical portion of the USB TYPE-C standard is used to transfer power (e.g., voltage and current) from the power converter 105 to the computing device 125. Accordingly, by including the port controller 130 the computing device 125 can prevent unsafe conditions and damage to the computing device 125, the cable 115, connector A 110, connector B 120 and/or the power converter 105.

The port controller 130 can be implemented in a processor, include a processor, access a processor and/or be an application specific integrated circuit (ASIC) including processing capabilities. In an example implementation, the port controller 130 communicates signals to a processor 220. The processor 220 can be configured to communicate an instruction to a battery charger 210. The battery charger 210 can be configured to draw an amount of current via $V_{bus}$. The battery charger 210 uses the current (or power based thereon) to charge the battery 215. The battery charger 210 can also use the current (or power based thereon) to power the computing device 125 with or without charging the battery 215.

The port controller 130 can be configured to compare $V_{bus}$ to a threshold voltage value. If $V_{bus}$ drops to a value below the threshold voltage value, the port controller 130 can be configured to communicate a signal indicating that $V_{bus}$ is less than the threshold voltage value to the processor 220. The processor 220 can then communicate an instruction to the battery charger 210 that causes the battery charger 210 to reduce the current draw, thus protecting the computing device 125, the cable 115, connector A 110, connector B 120 and/or the power converter 105 from damage due to over current conditions.

Figure 3:
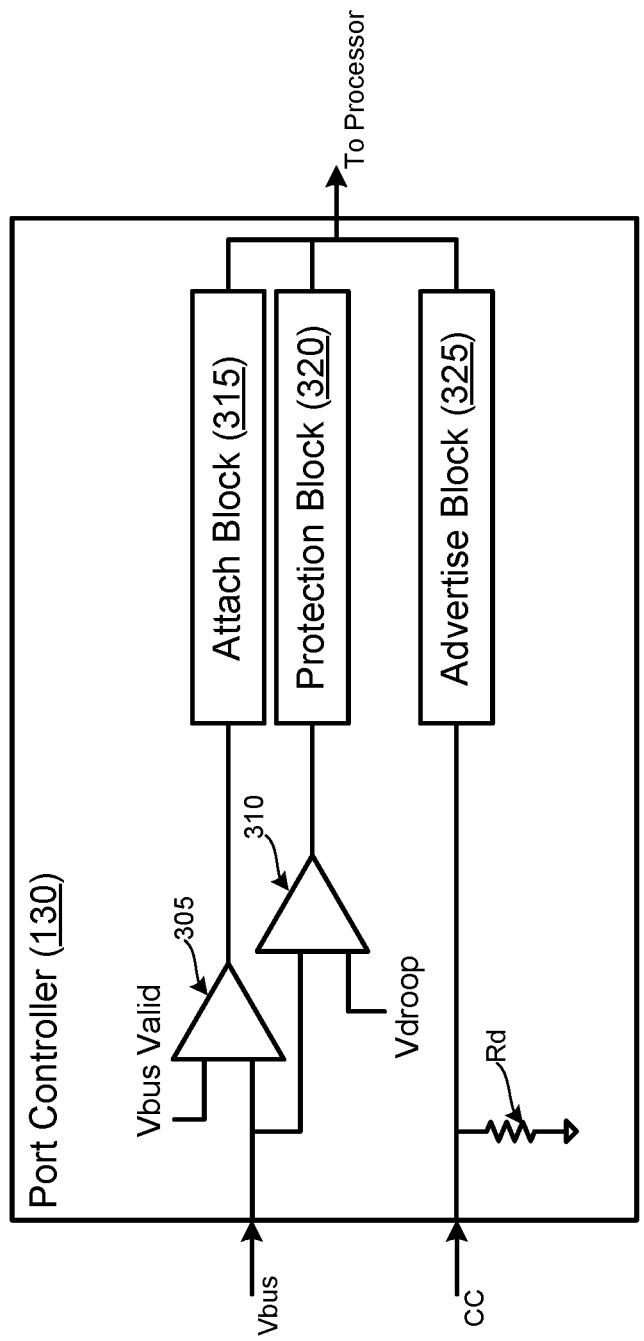
FIG. 3 is a block diagram illustrating a port controller according to at least one example embodiment.

FIG. 3 is a block diagram illustrating more details of the port controller 130 according to at least one example embodiment. As shown in FIG. 3, the port controller 130 includes an attach block 315. The attach block 315 is configured to receive an output of a first comparator 305 coupled to the $V_{bus}$ terminal and a $V_{bus\ valid}$ terminal. The $V_{bus\ valid}$ terminal can be coupled to a memory device storing a fixed or programmable value (e.g., $V_{bus\ valid}$). The fixed or programmable value can be associated with a USB standard and/or the device 125. For example, the fixed or programmable value can be a voltage value, minimum value, maximum value and/or range of values for charging battery 215. The first comparator 305 is configured to compare a value associated with $V_{bus}$ to a value associated with $V_{bus\ valid}$ terminal. Each value can be a voltage value or level. In an example implementation, if $V_{bus}$ is greater than or equal to the value associated with $V_{bus\ valid}$ terminal, the attach block 315 can be configured to communicate a signal indicating the computing device 125 is coupled to a valid (e.g., capable of charging the battery 215) power converter (e.g., power converter 105) to the processor 220. The processor 220 can then communicate an instruction to the battery charger 210 that causes the battery charger 210 to enable the computing device 125 as a power sink and to draw current based on the voltage drop across the pull-up resistor 205.

As shown in FIG. 3, the port controller 130 includes a protection block 320. The protection block 320 can be configured to cause the current drawn from the power converter 105 to be reduced in response to determining the current drawn from the power converter exceeds the capability of the power converter. A second comparator 310 can be configured to determine the current drawn from the power converter 105 exceeds the capability of the power converter 105. The protection block 320 is configured to receive an output of the second comparator 310 coupled to the $V_{bus}$ terminal and a $V_{droop}$ terminal. The second comparator 310 is configured to compare the value associated with $V_{bus}$ to a value associated with the $V_{droop}$ terminal. Each value can be a voltage value or level. If $V_{bus}$ is less than the value associated with the $V_{droop}$ terminal, the protection block 320 can be configured to communicate a signal indicating the $V_{bus}$ is less than the value associated with the $V_{droop}$ terminal to the processor 220. The processor 220 can then communicate an instruction to the battery charger 210 that causes the battery charger 210 to reduce the current draw, thus protecting the computing device 125, the cable 115, connector A 110, connector B 120 and/or the power converter 105 from damage due to over current conditions.

As shown in FIG. 3, the port controller 130 includes an advertise block 325. The advertise block 325 is configured to receive a communication from the power converter 105 (e.g., via the Configuration Channel (CC)). The communication can indicate at least one capability of the power converter 105. For example, the communication can include information (e.g., a model number) that the advertise block 325 can use to look-up (e.g., in a memory) the at least one capability of the power converter 105. The at least one capability of the power converter 105 can include a current capability of the power converter 105. The advertise block 325 can be configured to communicate a signal to the processor 220 indicating a maximum current draw from the power converter 105 based on the communicated information.

If there is no communication channel between the power converter 105 and the computing device 125 (e.g., no Configuration Channel (CC)), the advertise block 325 is further configured to determine a voltage drop across resistor $R_d$. As shown in FIGS. 2 and 3, current can be drawn from $V_{bus}$ through the Advertise Block 325, to ground via resistor $R_d$ in order to determine voltage drop across resistor $R_d$. If the voltage drop across resistor $R_d$ is above a threshold value, the advertise block 325 can be configured to communicate a signal to processor 220 indicating the computing device 125 is coupled to a valid (e.g., capable of charging the battery 215) power converter (e.g., power converter 105) to the processor 220. The advertise block 325 can be configured to communicate a signal to the processor 220 indicating a maximum current draw from the power converter 105 based on the voltage drop across the pull-up resistor 205.

Still further, the advertise block 325 can be configured to determine a connector (e.g., connector B 120), a cable assembly and/or a connector adapter coupled to the port controller 130 is not compliant with a standard (e.g., USB TYPE-C) used by the port controller 130. In other words, the advertise block 325 can be configured to determine cable assembly 145 and/or connector B 120 is a non-compliant USB TYPE-C cable assembly. For example, if there is no communication channel between the power converter 105 and the computing device 125 (e.g., no Configuration Channel (CC)) and if maximum current is determined based on a pull-up resistor (e.g., resistor $R_d$), the cable assembly 145 can be determined to be a non-compliant USB TYPE-C cable assembly.

The attach block 315, the protection block 320, and/or the advertise block 325 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications or code) include machine instructions for a programmable processor, and can be implemented in a high-level procedural and/or object-oriented programming language, and/or in assembly/machine language.

In response to communications and or signals received from the port controller 130, the processor 220 can communicate an instruction to the battery charger 210 that causes the battery charger 210 to draw current from the processor if one or both of the attach block 315 and the advertise block 325 communicate a signal indicating the computing device 125 is coupled to a valid (e.g., capable of charging the battery 215) power converter (e.g., power converter 105). The signals described above can be a voltage level, a data packet, an instruction code (e.g., a binary value, a hex value, and the like), and/or the like.

In an example implementation, if the current capability of the power converter 105 is less than the advertised (e.g., as determined based on resistor $R_d$) current capability because a non-compliant USB TYPE-C cable is being used the voltage $V_{bus}$ may droop (e.g., decrease due to an excess load) when the computing device 125 attempts to draw current based on the advertised current. The second comparator can be configured to determine if the voltage of the $V_{bus}$ droops below a threshold value (e.g., $V_{droop}$). If the voltage of the $V_{bus}$ droops below a threshold value, the computing device 125 can reduce the current draw and reduce functions such as battery charging. If the $V_{bus}$ line voltage recovers above the threshold the computing device may continue to charge. If the $V_{bus}$ line voltage does not recover, charging may be stopped (e.g., suspended, terminated).

The threshold value can be a fixed value (e.g., 2V, 3V, 4V, 10V, and the like). The threshold value can be user defined (e.g., a value configured by a user and stored on the computing device 125). The threshold value can be based on a delta from an initial bus voltage (e.g., from charge initialization). For example, the threshold can be initial $V_{bus}$–0.5V. The threshold value can be determined as, $$V_{droop} = V_{bus} - R_{loss} * I_{HOST} - V_{HYST}$$

where $V_{bus}$ is the bus voltage, $I_{HOST}$ is the actual current draw and $V_{HYST}$ is a sampling of the voltage history used to filter out transient noise. $V_{HYST}$ can be optional or set to zero (0). $R_{loss}$ is an attenuation (e.g., cable assembly loss) and can be determined as:

$$R_{loss} = V_{BusB}/I_B - V_{BusA}/I_A$$

where $I_A$ and $I_B$ can be determined by varying the load. $V_{BusA}$ and $V_{BusB}$ may be measured at the load variances determined for $I_A$ and $I_B$.

When $V_{bus}$ drops below the threshold value the port controller 130 can send an interrupt signal to a processor in order to report a low $V_{bus}$. When $V_{bus}$ drops below the threshold value (i.e. the value for $V_{droop}$) the port controller 130 can send a signal to change the advertised current to a lower value. When $V_{bus}$ drops below the threshold value, the processor 220 can reconfigure the battery charger 210 to draw less current. When $V_{bus}$ drops below the threshold value the port controller 130 can send a signal to stop drawing current.

A cable assembly that is non-compliant with the electrical portion of the USB TYPE-C standard does not provide a communication channel between the power converter and a computing device configured to implement the USB TYPE-C standard. Therefore, the power converter may not properly communicate, for example, capabilities (e.g., a maximum current capability) to the computing device when using the power converter to charge a battery of the device and/or to provide power for operation of the computing device. However, a cable assembly that is not compliant with the electrical portion of USB TYPE-C standard may include components (e.g., resistor 205 described above) used to cause the computing device to draw current from the power converter via the cable assembly even though the computing device has no information regarding the actual capabilities of the power converter.

For example, a cable assembly that is not compliant with the electrical portion of the USB TYPE-C standard may be packaged as a unit with a power converter capable of providing a current consistent with the components used to cause the computing device to draw current from the power converter. However, the cable assembly could be used with any power converter, including components based on the older USB standards, because the cable assembly is mechanically compatible with older USB standards. The cable assembly that is not compliant with the electrical portion of the USB TYPE-C standard can also be packaged as a standalone product without regard to a power converter that the cable assembly may be used with. Further, the components can be included in an adapter coupled between the device and a connector of the cable assembly such that any USB cable assembly can be converted to a cable assembly that is not compliant with the electrical portion of the USB TYPE-C standard.

Figure 4:
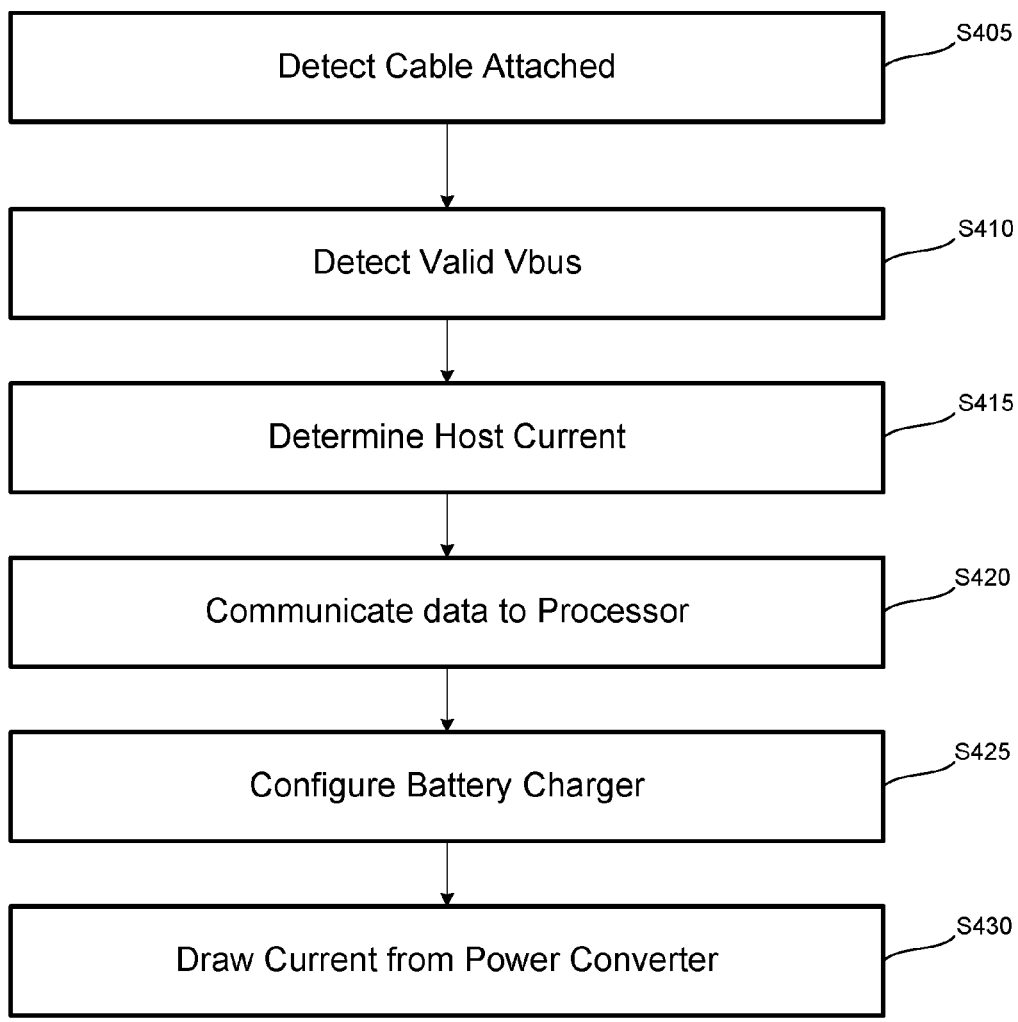
FIGS. 4 and 5 are flowcharts illustrating methods according to example embodiments.
Figure 5:
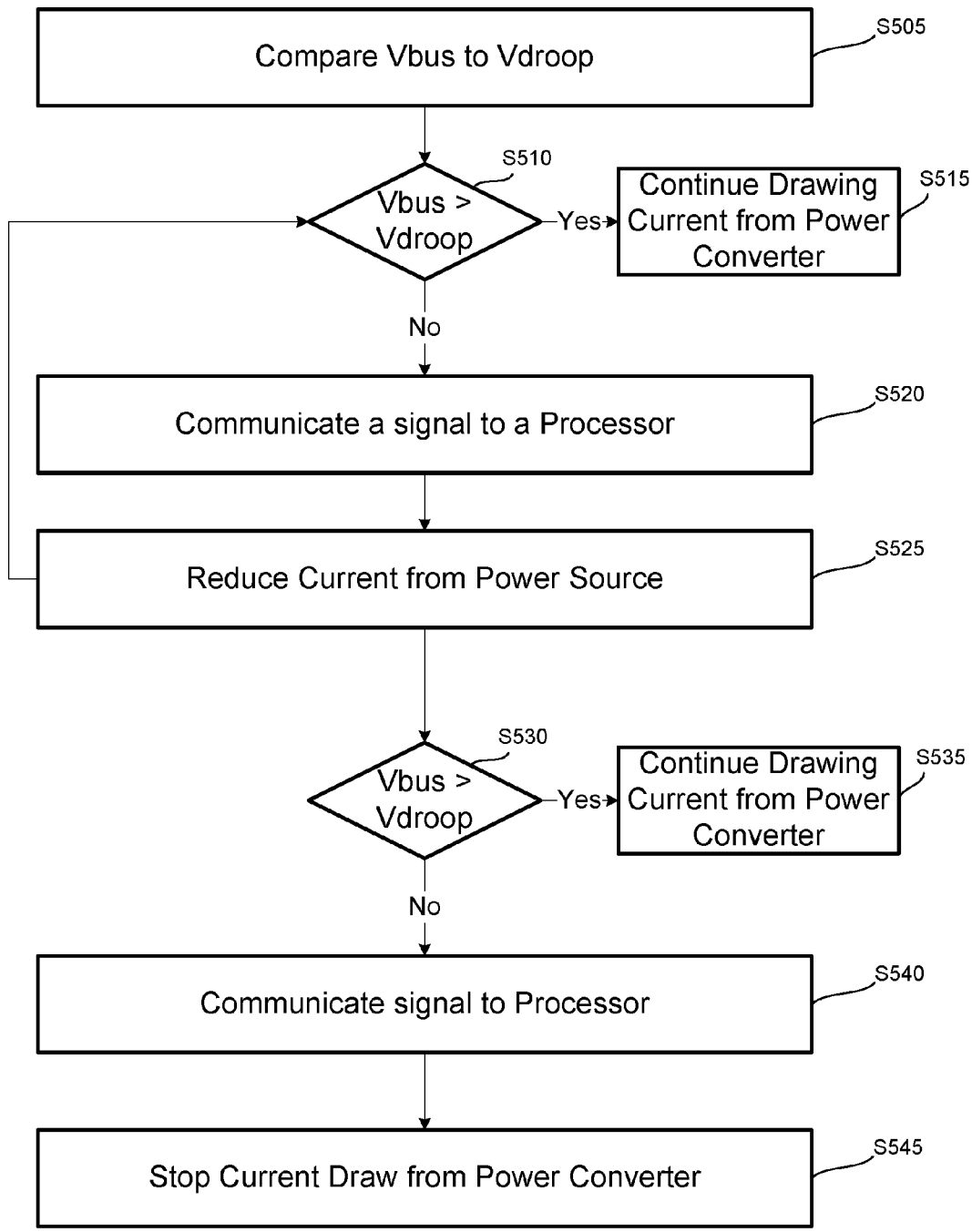

FIGS. 4 and 5 are flowcharts illustrating methods according to at least one example embodiment. The steps described with regard to FIGS. 4 and 5 may be performed due to the execution of software code stored in a memory and/or a non-transitory computer readable medium (e.g., memory included in computing device 125) associated with an apparatus (e.g., as shown in FIGS. 1-3 (described above)) and executed by at least one processor (e.g., port controller 130 and/or processor 220) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 4 and 5.

FIG. 4 is a flowchart illustrating a method for charging a computing device according to at least one example embodiment. As shown in FIG. 4, in step S405 a cable being attached is detected. For example, the computing device (e.g., computing device 125) can detect a valid voltage on the cable configuration (CC) terminal of a USB TYPE-C interface. The voltage of the CC terminal can correspond to a voltage drop across a pull-down resistor (e.g., $R_d$). In an example implementation, the advertise block 325 determines a voltage drop across resistor $R_d$. If the voltage drop across resistor $R_d$ is above a threshold value, the advertise block 325 communicates a signal indicating the computing device 125 is coupled (e.g., attached) to a power converter (e.g., power converter 105).

In step S410 a valid $V_{bus}$ is detected. For example, a minimum bus voltage may be necessary to charge (operate, and/or provide power to). The minimum bus voltage may be a threshold or minimum voltage value or range (e.g., a minimum and maximum voltage value). The threshold value or range may be set based on a standard (e.g., USB standards, such as Type-A, Type-B, Mini-, Micro-USB or USB TYPE-C standards). In an example implementation, the attach block 315 receives an output of a first comparator 305 coupled to the $V_{bus}$ terminal and a $V_{bus\ Valid}$ terminal (e.g., the threshold value). If $V_{bus}$ is determined to be greater than or equal to the value associated with $V_{bus\ Valid}$ terminal, the attach block 315 can be configured to communicate a signal indicating the computing device 125 is coupled to a valid (e.g., capable of charging the battery 215) power converter (e.g., power converter 105).

In step S415 a host current is determined. For example, the host current can be a maximum allowable current draw from the host (e.g., power converter). The host current can be determined based on a pull-up resistor. In an example implementation, a voltage drop across the pull-up resistor can be configured to indicate a capability (e.g., current capacity) of the power converter. For example, a voltage drop across the pull-up resistor 205 can indicate a maximum allowable current draw from the power converter 105. The advertise block 325 can be configured to measure a voltage drop across the pull-up resistor 205 to determine the maximum current draw from the power converter 105. As described above, when using a USB TYPE-C cable assembly that is not compliant with the electrical portion of the USB TYPE-C standard, an advertised host current can have no relationship to the actual current capability of the USB power supply (e.g., power converter 105). Accordingly, the computing device may attempt to draw current based on an advertised current maximum current draw that exceeds that capability of the USB power supply. This may result in unsafe conditions and/or damage to the computing device, the cable and/or the power supply.

In step S420 data is communicated to a processor. For example, data including, at least one of, an indication that a cable assembly is attached, an indication that a valid $V_{bus}$ is detected, and an indication of the host current can be communicated to the processor (e.g., processor 220). The data can be communicated as signals including a voltage level, a data packet, an instruction code (e.g., a binary value, a hex value, and the like), and/or the like. The data can be communicated individually, together and/or in combinations. The data can be communicated as the indications become available (e.g., when the host current is determined). The data can be communicated by one or more of the attach block 315, the protection block 320, and/or the advertise block 325.

In step S425 a battery charger is configured. For example, the processor (e.g., processor 220) can communicate instructions to a power management device (e.g., battery charger 210) indicating that a valid (e.g., capable of charging the battery 215) power converter (e.g., power converter 105) is coupled to (e.g., via cable 115) the computing device (e.g., computing device 125) and at least one of a maximum current draw and an amount of current to draw. The battery charger is then configured to draw current based on at least one of the maximum current draw and the amount of current to draw.

In step S430 current is drawn from a power converter. For example, in response to receiving the instructions from the processor (e.g., processor 220), the power management device (e.g., battery charger 210) can draw current from the power converter (e.g., power converter 105). In an example implementation, the battery charger 210 uses the current (or power based thereon) to charge the battery 215. The battery charger 210 can also use the current (or power based thereon) to power the computing device 125 with or without charging the battery 215. In an example implementation, the current is draw is based on the attached non-compliant USB TYPE-C cable assembly.

FIG. 5 is a flowchart illustrating a method for preventing an over current condition while charging a computing device according to at least one example embodiment. As shown in FIG. 5, in step S505 a bus voltage is compared to a threshold value. For example, $V_{bus}$ can be monitored to determine if it drops below $V_{droop}$. In an example implementation, the second comparator 310 is coupled to the $V_{bus}$ terminal and a $V_{droop}$ terminal. The second comparator 310 is configured to compare the value detected on $V_{bus}$ to a value associated with the $V_{droop}$ terminal. Each value can be a voltage value or level.

In step S510 whether the bus voltage is greater than the threshold value is determined. In response to determining the bus voltage is greater than (or equal to) the threshold value, in step S515, drawing current from the power converter is continued. In response to determining the bus voltage is less than the threshold value, in step S520 a signal is communicated to a processor. As described above, the threshold value can be a fixed value, a user configured value, and/or a variable value. Continuing the above example implementation, if $V_{bus}$ is less than the value associated with the $V_{droop}$ terminal, the protection block 320 can be configured to communicate a signal indicating the $V_{bus}$ is less than the value associated with the $V_{droop}$ terminal to the processor 220.

In step S525 the current draw from the power converter is reduced. For example, in response to receiving the signal that $V_{bus}$ has dropped below the threshold value, the processor 220 can reconfigure (e.g., send an instruction to) the battery charger 210 to draw less current. The processor 220 can reconfigure the battery charger 210 to at least one of a change the maximum current draw and change the amount of current to draw.

In step S530 whether the bus voltage is greater than the threshold value is determined. In response to determining the bus voltage is greater than (or equal to) the threshold value, in step S535, drawing current from the power converter is continued. In response to determining the bus voltage is less than the threshold value, in step S540 a signal is communicated to the processor. Continuing the above example implementation, if $V_{bus}$ continues to be less than the value associated with the $V_{droop}$ terminal, the protection block 320 can be configured to communicate another signal indicating the $V_{bus}$ continues to be less than the value associated with the $V_{droop}$ terminal to the processor 220.

In step S545 the current draw from the power converter is stopped. For example, in response to receiving the signal that $V_{bus}$ continues to be below the threshold value, the processor 220 can reconfigure (e.g., send an instruction to) the battery charger 210 to no (e.g., zero (0)) current. The processor 220 can reconfigure the battery charger 210 to at least one of a change the maximum current draw to zero, change the amount of current to draw to zero, indicate the that the power converter (e.g., power converter 105) is coupled to the computing device (e.g., computing device 125) is not a valid power converter, and/or indicate that the power converter has been disconnected from the computing device.

Although not shown in FIGS. 4 and 5 described above, if at any time the power converter is disconnected from the computing device, the port controller 130 can communicate a signal to the processor 220 that the power converter 105 is disconnected from the computing device (e.g., $V_{bus}$ is no longer valid as determined by the attach block 315). The processor 220 can then reconfigure the battery charger 210 to stop drawing current. In other words, detachment of the cable 115 can terminate the method steps described with regard to FIGS. 4 and 5.

In at least one general aspect, a port controller includes an advertise block configured to determine a cable assembly coupled to the port controller is not compliant with a standard used by the port controller, a comparator configured to determine a current drawn from a power converter coupled to the cable assembly exceeds a capability of the power converter based on comparing a bus voltage to a threshold voltage, and a protection block configured to, in response to determining the current drawn from the power converter exceeds the capability of the power converter, cause the current drawn from the power converter to be reduced.

In another general aspect, a method includes coupling a power converter to a device via a cable assembly configured to indicate incorrect information related to a capability of the power converter, drawing current from a power converter to at least one of charge a battery associated with a device or power the device, determining if a bus voltage on the device is less than a threshold voltage, and in response to determining the bus voltage is less than the threshold voltage, causing the current drawn from the power converter to be reduced.

In yet another general aspect, a device includes a battery, a battery charger configured to draw current from a power converter to at least one of charge the battery and power the device, and a port controller. The port controller is configured to determine a cable assembly coupled to the port controller is not compliant with a standard used by the device, determine a current drawn from the power converter coupled to the cable assembly exceeds a capability of the power converter based on comparing a bus voltage to a threshold voltage, and in response to determining the current drawn from the power converter exceeds the capability of the power converter, cause the current drawn from the power converter to be reduced.

Implementations can include one or more of the following features. For example, the current drawn from the power converter can exceed the capability of the power converter when the bus voltage is less than the threshold voltage. The threshold voltage can be one of a fixed value, based on a delta from an initial bus voltage, and based on the bus voltage, the current draw and an attenuation of the cable assembly. The advertise block can be configured to determine information related to a capability of the power converter, and the information related to the capability of the power converter is incorrect. The cable assembly and the power converter can be electrically configured based on a first USB standard, the port controller can be electrically configured based on an second USB standard, and the cable assembly, the power converter and the port controller are mechanically compatible. The port controller can be configured to communicate the current drawn from the power converter exceeds the capability of the power converter to a processor, and the processor instructs a battery charger to one of reduce the current drawn from the power converter or stop the current drawn from the power converter. The port controller can include an attach block configured to determine the cable assemble couples the power converter to the port controller based on the bus voltage exceeding a second threshold voltage, and in response to determining the cable assemble couples the power converter to the port controller, cause the current to be drawn from the power converter. The standard used by the port controller can be a USB TYPE-C standard, and the cable assembly can be determined to be not compliant with the USB TYPE-C standard if the cable assembly includes a pull-up resistor, a current capability of the power converter is based on the pull-up resistor and no communications are received from the power converter over a Configuration Channel (CC).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A port controller, comprising:
   an advertise block configured to determine a cable assembly coupled to the port controller is not compliant with a standard used by the port controller;
   a comparator configured to determine a current drawn from a power converter coupled to the cable assembly exceeds a capability of the power converter based on comparing a bus voltage to a threshold voltage; and
   a protection block configured to, in response to determining the current drawn from the power converter exceeds the capability of the power converter, cause the current drawn from the power converter to be reduced.

2. The port controller of claim 1, wherein the current drawn from the power converter exceeds the capability of the power converter when the bus voltage is less than the threshold voltage.

3. The port controller of claim 1, wherein the threshold voltage is one of:
   a fixed value,
   based on a delta from an initial bus voltage, and
   based on the bus voltage, the current draw and an attenuation of the cable assembly.

4. The port controller of claim 1, wherein
   the advertise block is configured to determine information related to a capability of the power converter, and
   the information related to the capability of the power converter is incorrect.

5. The port controller of claim 1, wherein
   the cable assembly and the power converter are electrically configured based on a first USB standard,
   the port controller is electrically configured based on an second USB standard, and
   the cable assembly, the power converter and the port controller are mechanically compatible.

6. The port controller of claim 1, wherein
   the port controller is configured to communicate the current drawn from the power converter exceeds the capability of the power converter to a processor; and
   the processor instructs a battery charger to one of reduce the current drawn from the power converter or stop the current drawn from the power converter.

7. The port controller of claim 1, wherein the port controller further comprises:
   an attach block configured to determine the cable assemble couples the power converter to the port controller based on the bus voltage exceeding a second threshold voltage; and
   in response to determining the cable assemble couples the power converter to the port controller, cause the current to be drawn from the power converter.

8. The port controller of claim 1, wherein
   the standard used by the port controller is a USB TYPE-C standard, and
   the cable assembly is determined to be not compliant with the USB TYPE-C standard if the cable assembly includes a pull-up resistor, a current capability of the power converter is based on the pull-up resistor and no communications are received from the power converter over a Configuration Channel (CC).

9. A method comprising:
   coupling a power converter to a device via a cable assembly configured to indicate incorrect information related to a capability of the power converter;

drawing current from a power converter to at least one of charge a battery associated with a device or power the device;

determining if a bus voltage on the device is less than a threshold voltage; and in response to determining the bus voltage is less than the threshold voltage, causing the current drawn from the power converter to be reduced.

10. The method of claim 9, wherein the threshold voltage is on of:
based on a delta from an initial bus voltage,
based on the bus voltage, the current drawn from the power converter and an attenuation of a cable coupled to the device, and
a fixed value.

11. The method of claim 9, further comprising:
determining the cable assembly is not compliant with a USB TYPE-C standard if the cable assembly includes a pull-up resistor, a current capability of the power converter is based on the pull-up resistor and no communications are received from the power converter over a Configuration Channel (CC).

12. The method of claim 9, wherein
the cable assembly and the power converter are electrically configured based on a first USB standard,
the device is electrically configured based on an second USB standard, and
the cable assembly, the power converter and device are mechanically compatible.

13. The method of claim 9, further comprising:
communicating the bus voltage is less than the threshold voltage to a processor,
instructing a battery charger, by the processor, to one of reduce the current drawn from the power converter or stop the current drawn from the power converter.

14. The method of claim 9, wherein the threshold voltage is a first threshold voltage and before drawing current from the power converter,
the method further comprising:
determining the bus voltage exceeds a second threshold voltage; and
in response to determining the bus voltage exceeds the second threshold voltage, causing the current to be drawn from the power converter.

15. The method of claim 9, wherein after causing the current drawn from the power converter to be reduced, the method further comprising:
while continuously monitoring the bus voltage, determining if the bus voltage is less than the threshold voltage; and
in response to determining the bus voltage is less than the threshold voltage, causing the current drawn from the power converter to be stopped.

16. A device, comprising:
a battery;
a battery charger configured to draw current from a power converter to at least one of charge the battery and power the device; and
a port controller configured to:
determine a cable assembly coupled to the port controller is not compliant with a standard used by the device;
determine a current drawn from the power converter coupled to the cable assembly exceeds a capability of the power converter based on comparing a bus voltage to a threshold voltage; and
in response to determining the current drawn from the power converter exceeds the capability of the power converter, cause the current drawn from the power converter to be reduced.

17. The device of claim 16, wherein:
the current drawn from the power converter exceeds the capability of the power converter when the bus voltage is less than the threshold voltage.

18. The device of claim 16, wherein the threshold voltage is one of a fixed value,
based on a delta from an initial bus voltage, and
based on the bus voltage, the current draw and a loss of the cable assembly.

19. The device of claim 16, wherein
the port controller is configured to determine information related to the capability of the power converter, and
the information related to the capability of the power converter is incorrect.

20. The device of claim 16, wherein
the cable assembly and the power converter are electrically configured based on a first USB standard,
the port controller is electrically configured based on an second USB standard, and
the cable assembly, the power converter and the port controller are mechanically compatible.

* * * * *